US011735953B2

(12) United States Patent
Li et al.

(10) Patent No.: US 11,735,953 B2
(45) Date of Patent: Aug. 22, 2023

(54) APPARATUS AND METHOD FOR CONTROLLING BATTERY MODULE, POWER SUPPLY DEVICE AND SYSTEM

(71) Applicant: Baidu Online Network Technology (Beijing) Co., Ltd., Beijing (CN)

(72) Inventors: Xiaobin Li, Beijing (CN); Bin Yi, Beijing (CN); Jinxiao Zhang, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 183 days.

(21) Appl. No.: 17/186,111

(22) Filed: Feb. 26, 2021

(65) Prior Publication Data

US 2022/0060049 A1 Feb. 24, 2022

(30) Foreign Application Priority Data

Aug. 18, 2020 (CN) .......................... 202010834511.9

(51) Int. Cl.
*H01M 10/44* (2006.01)
*H02J 7/00* (2006.01)
(Continued)

(52) U.S. Cl.
CPC ............. *H02J 9/068* (2020.01); *H01M 10/44* (2013.01); *H02J 7/0048* (2020.01);
(Continued)

(58) Field of Classification Search
CPC ...... H02J 9/068; H02J 7/00304; H02J 7/0048; H02J 7/007182; H01M 10/44; H01M 10/0525
See application file for complete search history.

(56) References Cited

U.S. PATENT DOCUMENTS 6,650,089 B1 11/2003 Freeman et al.
2008/0048608 A1* 2/2008 Lim .................... H02J 7/00302
320/128
(Continued)

FOREIGN PATENT DOCUMENTS

EP 2 983 000 A1 2/2016
JP 10-285826 A 10/1998
(Continued)

OTHER PUBLICATIONS

Sato JP2014079076A Machine Translation, May 2014 (Year: 2014).*
(Continued)

*Primary Examiner* — Drew A Dunn
*Assistant Examiner* — Pamela J Jeppson
(74) *Attorney, Agent, or Firm* — Keating & Bennett, LLP

(57) ABSTRACT

The present disclosure provides an apparatus for controlling battery module, power supply device and power supply system. The apparatus includes a switch circuit and a first power controller. The first power controller is coupled with the switch circuit, a first busbar, a second busbar, and a battery module, and is configured to: control the switch circuit to conduct in a first direction, in a case of the voltage between the first busbar and the second busbar being greater than the voltage of the battery module and the power of the battery module being smaller than a first preset power; and control the switch circuit to conduct in a second direction, in a case of the voltage between the first busbar and the second busbar being smaller than the voltage of the battery module and the power of the battery module being greater than a second preset power.

14 Claims, 9 Drawing Sheets

(51) Int. Cl.
*H02J 9/06* (2006.01)
*H01M 10/0525* (2010.01)

(52) U.S. Cl.
CPC .... *H02J 7/00304* (2020.01); *H02J 7/007182* (2020.01); *H01M 10/0525* (2013.01)

(56) References Cited

U.S. PATENT DOCUMENTS

| | | | |
|---|---|---|---|
| 2013/0234508 A1 | 9/2013 | Eisele et al. | |
| 2014/0078632 A1* | 3/2014 | Jung | H02H 7/18 361/87 |
| 2014/0122906 A1 | 5/2014 | Whitted et al. | |
| 2016/0003915 A1 | 1/2016 | Kamei | |
| 2016/0059730 A1* | 3/2016 | Ishibashi | B60L 53/65 307/10.1 |
| 2016/0204632 A1* | 7/2016 | Kleine | H02J 7/34 320/134 |
| 2016/0301232 A1 | 10/2016 | Shiobara | |
| 2017/0025891 A1 | 1/2017 | Kim et al. | |
| 2018/0026456 A1 | 1/2018 | Kang | |
| 2018/0102529 A1 | 4/2018 | Kobayashi et al. | |
| 2019/0206638 A1* | 7/2019 | Askan | H01H 9/548 |
| 2019/0337475 A1 | 11/2019 | Kawamura | |

FOREIGN PATENT DOCUMENTS

| | | |
|---|---|---|
| JP | 10-290536 A | 10/1998 |
| JP | 10-341535 A | 12/1998 |
| JP | 2012-085461 A | 4/2012 |
| JP | 2014-079076 A | 5/2014 |
| JP | 2015-100195 A | 5/2015 |
| JP | 2016-015277 A | 1/2016 |
| JP | 2019-075933 A | 5/2019 |
| WO | 2016/207949 A1 | 12/2016 |
| WO | 2019/125495 A1 | 6/2019 |

OTHER PUBLICATIONS

Official Communication issued in corresponding European Application No. 21160457.4, dated Aug. 25, 2021.
Official Communication issued in corresponding European Application No. 21160457.4, dated May 10, 2022.
Official Communication issued in corresponding Japanese Patent Application No. 2021-049445, dated Mar. 24, 2022.

* cited by examiner

APPARATUS AND METHOD FOR CONTROLLING BATTERY MODULE, POWER SUPPLY DEVICE AND SYSTEM

CROSS-REFERENCE TO RELATED APPLICATIONS

This application claims priority to CN patent Application No. 202010834511.9 filed on Aug. 18, 2020, the content of which is hereby incorporated by reference in its entirety.

TECHNICAL FIELD

The present disclosure relates to a field of electronic circuit, and in particular to a field of power converting and uninterruptible power supplying for data center, and may be applied to a field of cloud computing or cloud serving where uninterruptible power supplying is highly required.

BACKGROUND

Generally, a data center configures a generator set as a backup power supply, which is used to supply continuous power to the load when the mains power supply is abnormal. However, in a process of switching from the mains power supply to the generator set power when the mains power supply is abnormal, startup of the generator set has a certain delay, causing the load to be in a power-off state during the delay. In order to avoid power-off of the load due to the delay, it is desired to provide an Uninterruptible Power Supply to ensure the continuity of the power supply for the load during the delay.

An Uninterruptible Power Supply (UPS) usually consists of a cabinet equipped with battery modules. An Uninterruptible Power Supply or a High Voltage Direct Current (HVDC) converter is intended to control the charging and discharging of the battery module. However the coupling between the battery module and the UPS/HVDC is relatively strong and it is difficult to determine the position causing the fault.

SUMMARY

According to a first aspect, there is provided an apparatus for controlling battery module, comprising: a switch circuit, coupled with a battery module in series between a first busbar and a second busbar, to form a conductive loop including the switch circuit, the battery module, the first busbar and the second busbar; and a first power controller, coupled with the switch circuit, the battery module, the first busbar, and the second busbar, and configured to: detect a voltage between the first busbar and the second busbar, and monitor a voltage and a power of the battery module; enter a charging mode in a case of the voltage between the first busbar and the second busbar being greater than the voltage of the battery module and the power of the battery module being smaller than a first preset power, and under the charging mode, control the switch circuit to conduct in a first direction, to charge the battery module via the conductive loop by using the voltage between the first busbar and the second busbar; and enter a discharging mode in a case of the voltage between the first busbar and the second busbar being smaller than the voltage of the battery module and the power of the battery module being greater than a second preset power, and under the discharging mode, control the switch circuit to conduct in a second direction opposite to the first direction, to cause the battery module to supply power to the first busbar and the second busbar via the conductive loop.

According to a second aspect, there is provided a power supply device, comprising: the apparatus for controlling battery module described above; and a battery module.

According to a third aspect, there is provided a power supply system comprising: a plurality of power supply devices described above; and a third power controller, coupled with the first power controller of each of the plurality of power supply devices, and configured to: receive a voltage or power of the battery module in each power supply device provided by the first power controller of said each power supply device, select at least one of the plurality of power supply devices as a charged device and at least another one of the plurality of power supply devices as a charging device based on the voltage or power of the battery module, transmit a charging instruction to the charged device, and transmit a discharging instruction to the charging device.

According to a fourth aspect, there is provided a method of controlling battery module performed by the apparatus for controlling battery module described above, comprising: detecting, by a first power controller, a voltage between a first busbar and a second busbar, and monitoring a voltage of the battery module and a power of the battery module; the first power controller entering a charging mode in a case of the voltage between the first busbar and the second busbar being greater than the voltage of the battery module and the power of the battery module being smaller than a first preset power, and under the charging mode, control a switch circuit to conduct in a first direction, to charge the battery module via a conductive loop by using the voltage between the first busbar and the second busbar; and the first power controller entering a discharging mode in a case of the voltage between the first busbar and the second busbar being smaller than the voltage of the battery module and the power of the battery module being greater than a second preset power, and under the discharging mode, control the switch circuit to conduct in a second direction opposite to the first direction, to cause the battery module to supply power to the first busbar and the second busbar via the conductive loop.

It should be understood that the content described here is not intended to identify key or important features of the embodiments of the present disclosure, and is not intended to limit the scope of the present disclosure. Other features of the present disclosure may be easily understood according to the following description.

BRIEF DESCRIPTION OF THE ACCOMPANYING DRAWINGS

The accompanying drawings are used to better understand the scheme and are not intended to constitute a limitation on the present disclosure, in which.

DETAILED DESCRIPTION

Exemplary embodiments of the present disclosure are described below with reference to the accompanying drawings, wherein various details of the embodiments of the present disclosure are included for better understanding, and should be considered as merely exemplary. Therefore, those of ordinary skill in the art should realize that various changes and modifications may be made to the embodiments described herein without departing from the scope and spirit of the present disclosure. Similarly, for clarity and conciseness, descriptions of well-known functions and structures are omitted in the following description.

The present disclosure provides an apparatus for controlling battery module, a power supply device and a power supply system, which are compatible with the UPS/HVDC and can be decoupled from the UPS/HVDC, in order to reduce the difficulty of fault locating.

Figure 1:
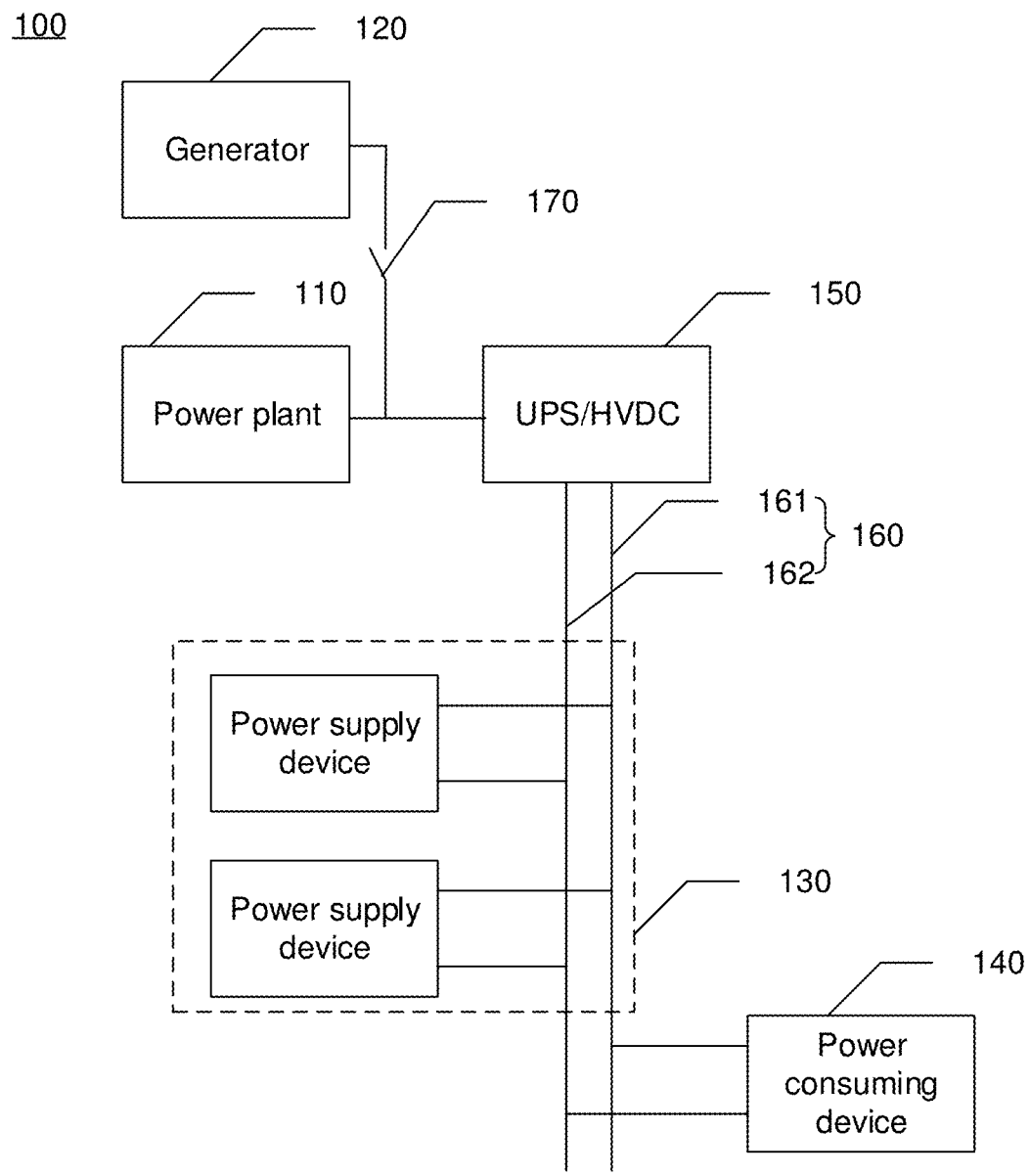
FIG. 1 is a schematic diagram of an application scene for a power supply system according to an embodiment of the present disclosure.

FIG. 1 is a schematic diagram of an application scene for a power supply system according to an embodiment of the present disclosure. It should be noted that FIG. 1 is only an example of an application scene in which the embodiments of the present disclosure may be applied, so as to help those skilled in the art to understand the technical content of the present disclosure. It does not mean that the embodiments of the present disclosure cannot be used for other devices, systems or scenes.

As shown in FIG. 1, the application scene 100 of the embodiment may include a power plant 110, a generator 120, a power supply system 130, a power consuming device 140, a converting device 150, and a busbar 160.

The power supply system 130 includes at least one power supply device, and each power supply device may be integrated in a cabinet. The converting device 150, for example, may be UPS or HVDC, and the busbar 160 may include a first busbar 161 and a second busbar 162, wherein one of the first busbar 161 and the second busbar 162 is used as a positive busbar, and the other busbar is used as a negative busbar. A mains voltage supplied by the power plant 110 may be converted into a direct current voltage via UPS/HVDC, and supply power to the power consuming device 140 via the busbar 160. Similarly, a voltage supplied by the generator 120 may be converted into a direct current voltage via UPS/HVDC, and supply power to the power consuming device 140 via the busbar 160. In the scene, the generator 120 is used as a backup power supply for the power plant 110 to supply power to the power consuming device 140 when the mains power is cutoff.

HVDC may include, for example, a converter, a converter transformer, a flat wave reactor, a filter, an earth electrode, and a controlling and protecting device etc. The HVDC may, for example, adjust magnitude of output current and magnitude of output voltage according to magnitude of the load coupled with the busbar 160, in order to convert the mains voltage supplied by the power plant 110 or the voltage supplied by the generator 120 into a voltage required by the load. The load coupled with the busbar 160 may include the power consuming device 140 and a power supply device in a charging state. For example, the first busbar 161 may be led out from a positive output end of HVDC, and the second busbar 162 may be led out from a negative output end of HVDC.

The UPS, for example, may include an AC/DC (alternating current/direct current) converter and a DC/AC (direct current/alternating current) converter. The first busbar 161 may be led out from a positive line coupled between the AC/DC converter and the DC/AC converter, and the second busbar 162 may be led out from a negative line coupled between the AC/DC converter and the DC/AC converter.

The power consuming device 140 may be, for example, a server, a database, a network switch, a network monitoring end and other device etc provided in a data center. In an embodiment, the server may be a server of a distributed system, or a server based on blockchain. Further, the server may be a cloud server, or a smart cloud computing server or smart cloud host based on artificial intelligence technology, etc.

According to an embodiment of the present disclosure, the generator 120 may be, for example, a diesel generator or a gas generator. As shown in FIG. 1, for example, the generator 120 may be coupled with the HVDC/UPS via a switch 170 and the switch 170 is in a cutoff state when the power plant 110 is supplying voltage. When the power plant 110 is cutoff, power may be supplied to the power consuming device 140 in the data center by switching the switch 170 to a conductive state and starting up the generator 120.

According to an embodiment of the present disclosure, the startup delay of the generator 120 may lead to power-off of the power consuming device 140 in the process of switching the power supply from the power plant 110 to the generator 120. In order to avoid this situation, it is also possible to charge the power supply device in the power supply system 130 during the power supplying of the power plant 110, so that the power supply system 130 may supply power to the power consuming device 140 if the generator 120 and the power plant 110 are determined to be cutoff according to the voltage between the first busbar 161 and the second busbar 162. The voltage supplied by the power plant 110 via UPS/HVDC and the voltage supplied by the generator 120 via UPS/HVDC are both greater than the voltage of the power supply system 130. Therefore, if it is determined that the voltage between the first busbar 161 and the second busbar 162 is smaller than the voltage of the power supply system 130, both the generator 120 and the power plant 110 may be cutoff.

It can be understood that the types of the generator, power plant, and power consuming device in the application scene described in FIG. 1 are only examples to facilitate the understanding of the present disclosure, and is not limited in the present disclosure. The power supply system provided by the embodiments of the present disclosure may be the power supply system 130 described in FIG. 1.

The power supply device in the power supply system 130 will be described in details below based on the application scene described in FIG. 1 and in conjunction with FIG. 2.

Figure 2:
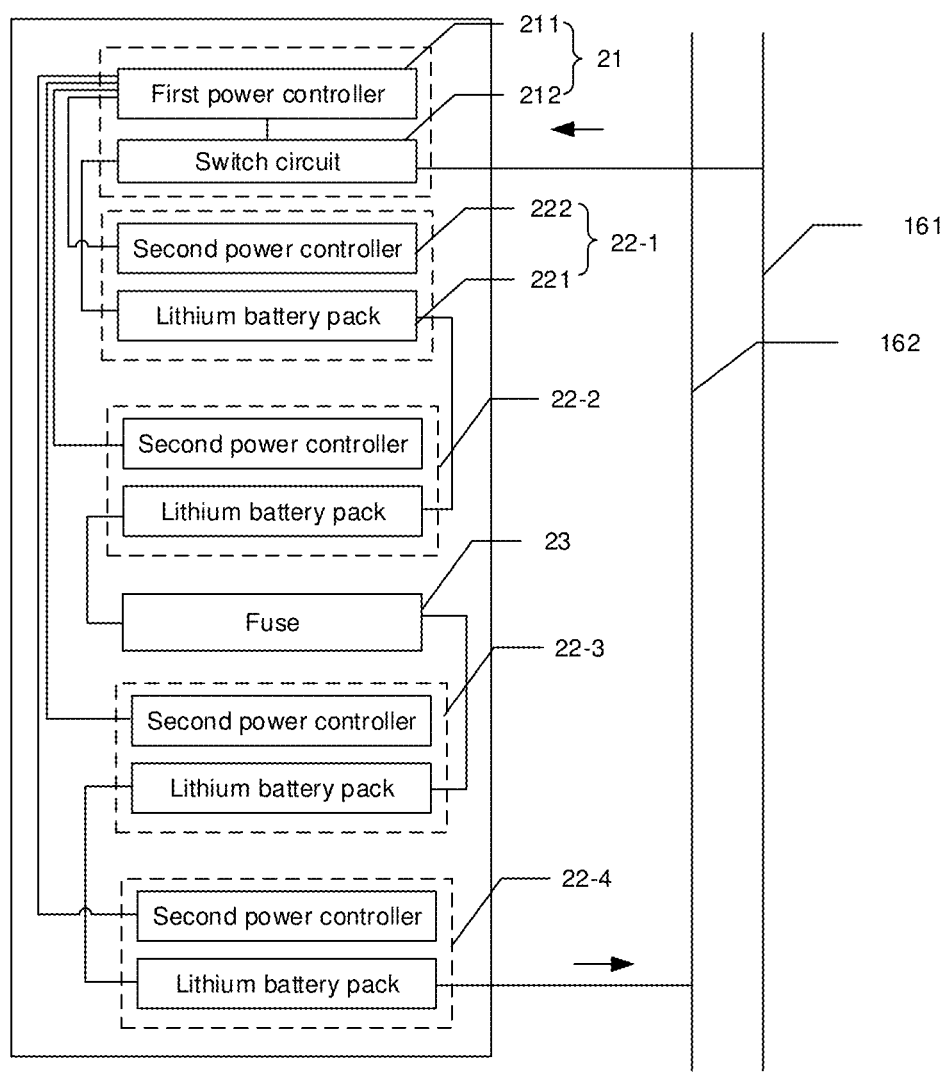
FIG. 2 is a schematic structural diagram of a power supply device according to an embodiment of the present disclosure.

FIG. 2 is a schematic structural diagram of a power supply device according to an embodiment of the present disclosure.

As shown in FIG. 2, the power supply device 20 of the embodiment may include, for example, an apparatus 21 for controlling battery module and a battery module. The power supply device 20 may include one or more battery modules, for example, battery modules 22-1, 22-2, 22-3, and 22-4, etc. (hereinafter collectively called battery module 22). In case that there is a plurality of battery modules 22, as shown in FIG. 2, the plurality of battery modules 22 are coupled in series. For ease of description, the power supply device is described in details by taking the first busbar 161 being the positive busbar and the second busbar 162 being the negative busbar as an example. It can be understood that, in another embodiment, the first busbar 161 may be taken as the negative busbar, and the second busbar 162 may be taken as the positive busbar.

The apparatus 21 for controlling battery module may include, for example, a first power controller 211 and a switch circuit 212 coupled with the first power controller 211. The first power controller 211 may control the switch circuit 212 to conduct or to be cutoff, for example. In order to control the charging and discharging of the battery module 22, the switch circuit 212 may be coupled with the battery module 22 and coupled with the first busbar 161, and the battery module may be coupled with the second busbar 162, such that a conductive loop including the battery module 22, the first busbar 161 and the second busbar 162 may be formed. Therefore, after the power plant is powered-off, the battery module 22 having power may supply power to the first busbar 161 and the second busbar 162 via the conductive loop during the process of supplying voltage switching from the power plant to the generator, avoiding data loss of the data center due to power-off of the power consuming device. In case that there is a plurality of battery modules, the switch circuit 212 may be coupled to the plurality of battery modules 22 coupled in series. The first power controller may be, for example, a Battery Management System (BMS).

According to an embodiment of the present disclosure, the first power controller 211 may further be coupled with the battery module 22 and may monitor a voltage of the battery module 22, for example, in order to achieve automatic control of the charging and discharging of the battery module 22.

According to an embodiment of the present disclosure, when the power plant is supplying voltage, for example, the power supply device 20 may charge the battery module by using a voltage between the first busbar 161 and the second busbar 162, in order to enable the battery module 22 to supply power to the first busbar 161 and the second busbar 162. In case that the battery module is not fully charged, the voltage of the battery module is smaller than the voltage between the first busbar 161 and the second busbar 162. Therefore, the first power controller 211 may control the switch circuit 212 to enter a charging mode if it monitors that the voltage between the first busbar 161 and the second busbar 162 is greater than the voltage of the battery module 22. Under the charging mode, the first power controller 211 may, for example, control the switch circuit 212 to conduct in a first direction (the first direction may be a direction flowing from the first busbar 161 to the switch circuit 212, and from the switch circuit 212 to the second busbar 162 as shown by the arrow direction in FIG. 2), so that current may flow from the first busbar 161 to the battery module 22 via the conductive loop, and to the second busbar 162 via the battery module 22 and the conductive loop. In this manner, the power supply device 20 may charge the battery module 22 via the conductive loop by using the voltage between the first busbar 161 and the second busbar 162.

According to an embodiment of the present disclosure, since the busbar is led out from the UPS/HVDC coupled with the power plant, the voltage between the first busbar 161 and the second busbar 162 is a direct current voltage output by the UPS/HVDC in case that the battery module is not supplying power. In a case of the power consuming device having not changed, the voltage between the first busbar 161 and the second busbar 162 is a fixed voltage. The fixed voltage is generally greater than a maximum voltage of the battery module 22, in order to ensure that the power plant is preferably used to supply voltage to the power consuming device in case that the power plant is not cutoff. Therefore, if the first power controller 211 detects that the voltage between the first busbar 161 and the second busbar 162 is smaller than the voltage of the battery module 22, it is possible to indicate that the power plant is powered off and the generator has not supplied voltage. In order to ensure the uninterruptible power supply of the power supply device when the power plant is cutoff, the first power controller 211 may control the switch circuit 212 to conduct in a second direction opposite to the first direction to cause the power supply device 20 to enter a discharging mode. At this time, due to a voltage difference between the first busbar 161, the second busbar 162 and the battery module 22, current may flow in the direction from the battery module 22 to the first busbar 161 via the conductive loop, and back to the battery module 22 via the second busbar 162 and the conductive loop, so that the battery module 22 may supply power to the first busbar 161 and the second busbar 162 via the conductive loop.

According to an embodiment of the present disclosure, in order to achieve automatic power supply, the first power controller 211 may, for example, control the switch circuit 212 to cause the power supply device 20 enter a standby mode. Under the standby mode, the switch circuit 212 is conducted in the second direction (the direction opposite to the arrow direction in FIG. 2). Since the conductive loop is conducted when the power supply device 20 is in the standby mode, the current in the conductive loop may flow in the second direction if the voltage between the first busbar 161 and the second busbar 162 is smaller than the voltage of the power supply device 20. In this manner, the power supply device 20 is switched to the discharging mode, to supply power to the first busbar 161 and the second busbar 162 via the conductive loop.

According to an embodiment of the present disclosure, for example, the first power controller 211 may further monitor the power of the battery module 22, in order to avoid overcharging when the battery module 22 is being charged, or avoid over-discharging when the battery module 22 is supplying power. Only if the power of the battery module 22 is smaller than a first preset power, the first power controller 211 may control the power supply device 20 to enter the charging mode. Only if the power of the battery module 22 is greater than a second preset power, the first power controller 211 may control the power supply device 20 to enter the discharging mode. In order to ensure a sufficient power during power supply, the first preset power may be set to be relatively large, for example, 95%, 90%, or other values smaller than 100%. In order to ensure an uninterruptible power supply, the second preset power may be set to be relatively small, for example, 5%, 10%, etc. It can be understood that the above values of the first preset power and the second preset power are only used as examples to facilitate the understanding of the present disclosure, and is not limited in the present disclosure.

For example, the first power controller 211 may enter a charging mode if the voltage between the first busbar 161 and the second busbar 162 is greater than the voltage of the battery module 22 and the power of the battery module 22 is smaller than a first preset power. Under the charging mode, the first power controller 211 controls the switch circuit 212 to conduct in a first direction, to charge the battery module 22 via the conductive loop by using the voltage between the first busbar 161 and the second busbar 162. Further, the first power controller 211 may enter a discharging mode if the voltage between the first busbar 161 and the second busbar 162 is smaller than the voltage of the battery module 22 and the power of the battery module 22 is greater than a second preset power. Under the discharging mode, The first power controller 211 controls the switch circuit 212 to conduct in a second direction opposite to the first direction, to cause the battery module 22 to supply power to the first busbar 161 and the second busbar 162 via the conductive loop.

In related technologies, lead-acid batteries are generally used to form battery modules, but lead-acid batteries are generally large in size, short in life, small in storage power, and require continuously floating charge, having technological problems such as poor maintenance and high operating costs. In order to avoid these technical problems, the embodiments of the present disclosure may use lithium batteries that are increasingly perfect in terms of safety and performance to form a battery module. Since lithium batteries do not require floating charge, and have the advantages of decreasing cost year by year, long life and easy maintenance, lithium batteries may gradually become a new trend in data center applications.

According to an embodiment of the present disclosure, the battery module 22 may include, for example, a lithium battery pack 221 and a second power controller 222. The lithium battery pack 221 includes one lithium battery or a plurality of lithium batteries coupled in series. The second power controller 222 may be, for example, a Battery Management System (BMS). The second power controller 222 is coupled with the lithium battery pack 221 and the first power controller 211, and the second power controller 222 forms a two-level battery management system with the first power controller 211. The second power controller 222 may detect a power of the lithium battery pack 221 and a voltage of the lithium battery pack 221, and supply the detected power of the lithium battery pack 221 and the voltage of the lithium battery pack 221 to the first power controller 211, to enable the first power controller 211 to monitor the power of the battery module 22 and the voltage of the battery module 22. As shown in FIG. 2, a plurality of battery modules 22 are included, a second power controller 222 included in each battery module 22 may be coupled with the first power controller 211 respectively, and the first power controller 211 may acquire a total power and total voltage of the battery modules 22 according to the power and voltage supplied by the second power controller 222 in each battery module 22.

According to an embodiment of the present disclosure, the lifetime of the lithium battery in the battery module 22 may be shortened if the current in the conductive loop is greater than a rated current of the battery module 22 for a long time. In order to avoid this situation, a fuse may be set in the power supply device 20. For example the fuse may be arranged outside the apparatus for controlling battery module, improving the convenience of replacing the fuse. Furthermore, in case that there are a plurality of battery modules, the fuse may be set between any two of the plurality of battery modules to divide the plurality of battery modules into two groups, such that the voltage between both sides of the fuse is reduced, thereby improving the safety in installation and maintenance of the power supply device. As shown in FIG. 2, taking the number of the plurality of battery modules as four for an example, the four battery modules may be divided into a first group of battery modules and a second group of battery modules. The first group of battery modules includes battery module 22-1 and battery module 22-2 of the four battery modules, the second group of battery modules includes battery module 22-3 and battery module 22-4 of the four battery modules, and a fuse 23 is coupled between the first group of battery modules and the second group of battery modules. In order to effectively reduce the voltage between both sides of the fuse 23, the number of battery modules in the first group of battery modules may be close to or equal to the number of battery modules in the second group of battery modules. The fuse 23 may be fused in response to a temperature exceeding a preset temperature, to cut off the conductive loop including the power supply device 20, the first busbar 161, and the second busbar 162, preventing the battery module 22 from being damaged by a large current.

It should be noted that the number of battery modules included in the power supply device in FIG. 2 may be set according to, for example, the size of the cabinet containing the power supply device and the size of the battery modules.

The embodiment of the present disclosure further provides a power supply system, which may be implemented by the power supply system 130 described in FIG. 1.

Figure 3:
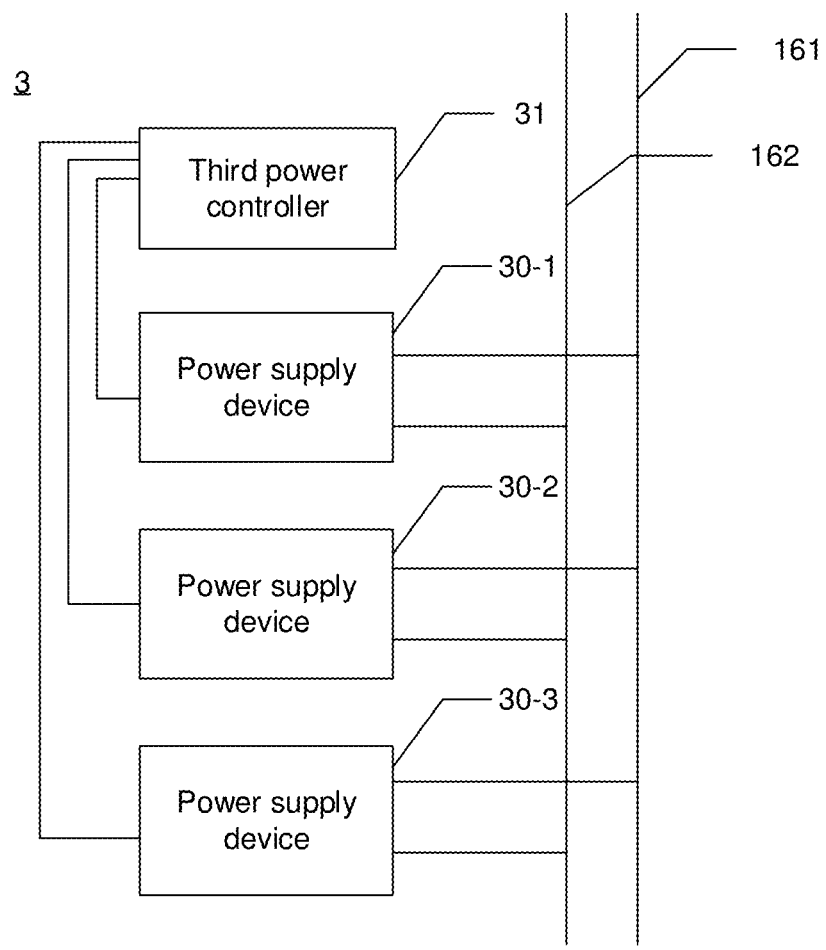
FIG. 3 is a schematic structural diagram of a power supply system according to an embodiment of the present disclosure.

FIG. 3 is a schematic structural diagram of a power supply system according to an embodiment of the present disclosure.

As shown in FIG. 3, the power supply system 3 of the embodiment includes a plurality of power supply devices, for example, a power supply device 30-1, a power supply device 30-2, a power supply device 30-3, etc. (hereinafter collectively called power supply device 30). The power supply device 30 includes the battery module and the apparatus for controlling battery module described above. The switch circuit of each of the plurality of power supply devices 30 is coupled with the first busbar 161, and the battery module in each power supply device is coupled with the second busbar 162, i.e., the plurality of power supply devices 30 are coupled in parallel.

According to an embodiment of the present disclosure, the power supply system 3 may further be provided with a third power controller 31. The third power controller 31 is coupled with the first power controller in each power supply device to manage and control the plurality of power supply devices 30. The third power controller 31 may be, for example, a Battery Management System (BMS). A three-level battery management system including third power controller 31, the first power controller in each power supply device and the second power controller included in the battery module in each power supply device may be formed. Correspondingly, each first power controller may supply the monitored voltage and power of the battery module to the third power controller 31. The third power controller 31 may include, for example, a displaying screen to display the voltage and power of the battery module in the power supply device, which is supplied by the first power controller of each unit device and received by the third power controller, so that a user, e.g. a worker, can understand the working conditions of each power supply device immediately.

According to an embodiment of the present disclosure, when a plurality of power supply devices 30 are started up, the third power controller may, for example, further control the power supply device having higher power or voltage to supply power to a power supply device having lower power or voltage, to ensure a power balance among the plurality of power supply device.

According to an embodiment of the present disclosure, the third power controller may select at least one of the plurality of power supply devices 30 as the charged device, select at least another one of the plurality of power supply devices 30 as a charging device, and transmit a charging instruction to the charged device and a discharging instruction to the charging device based on the received voltage or power of the battery module.

For example, as shown in FIG. 3, taking three power supply devices as an example, if the power supply device 30-1 is selected as the charged device, and the power supply device 30-2 is selected as the charging device. The third power controller 31 may transmit the charging instruction to the first power controller in the charged device 30-1 to instruct the first power controller in the charged device 30-1 to control the switch circuit to conduct in the first direction described above; and transmit the discharging instruction to the first power controller in the charging device 30-2 to instruct the first power controller in the charging device 30-2 to control the switch circuit to conduct in the second direction described above. In this manner, there is a voltage difference between the first pair of contacts of the charged device 30-1 coupled with the first busbar 161 and the second busbar 162 and the second pair of contacts of the charging device 30-2 coupled with the first busbar 161 and the second busbar 162, and the voltage of the second pair of contacts is greater than the voltage of the first pair of contacts. Accordingly, the current in the first busbar 161 acting as the positive busbar may automatically flow from the second pair of contacts to the first pair of contacts, and thus flow to the conductive loop including the charged device 30-1, the first busbar 161 and the second busbar 162, such that power is supplied from the charging device 30-2 to the charged device 30-1.

For example, in determining the charged device and the charging device, two power supply devices, with the voltage difference between battery modules of the two power supply devices being greater than a preset voltage difference, are selected from the plurality of power supply devices according the received voltage of battery module of each power supply device; and then one of the two power supply devices having a higher voltage of battery module is determined as the charging device, and the other one of the two power supply devices having a lower voltage of battery module is determined as the charged device. The preset voltage difference may be set as desired in practice, and is not limited in the present disclosure. For example, in some embodiments, the voltage difference may be set to 10V.

For example, in determining the charged device and the charging device, it is possible to select two power supply device corresponding to the power of two battery modules having a power difference greater than a preset power difference from the received power of the respective battery module of the plurality of power supply devices, determine a power supply device with a larger battery module power as the charging device, and the other power supply device with a smaller battery module power as the charged device in the two selected power supply devices.

For example, in determining the charged device and the charging device, for example, it is also possible to select a power supply device for a voltage of a battery module greater than a fourth preset voltage as the charging device and a power supply device for a voltage of a battery module smaller than a fifth preset voltage as the charged device from the received voltage of the respective battery module of the plurality of power supply devices. For example, if a rated voltage of the power supply device is 200V, the fourth preset voltage may be set to 190V, 180V, etc. with a smaller difference from the rated voltage, and the fifth preset voltage may be set to 20V, 30V, etc. with a greater difference from the rated voltage. It may be understood that the fourth preset voltage and the fifth preset voltage may be set as desired in practice, and is not limited in the present disclosure.

For example, in determining the charged device and the charging device, for example, it is also possible to select a power supply device for a power of a battery module greater than a fourth preset power as the charging device and a power supply device for a power of a battery module smaller than a fifth preset power as the charged device from the received power of the respective battery module of the plurality of power supply devices. For example, if a rated power of the power supply device is 10 Ah, the fourth preset power may be set to 9 Ah, 9.5 Ah, etc. with a smaller difference from the rated power, and the fifth preset power may be set to 1 Ah, 0.5 Ah, etc. with a greater difference from the rated power. It can be understood that the fourth preset power and the fifth preset power may be set as desired in practice, and is not limited in the present disclosure.

It should be noted that the number of power supply devices in FIG. 3 may be set as desired in practice. The number of power supply devices may be flexibly configured according to the rated power of the power consuming device 140 and the time required by the process of switching from the mains supply voltage to the generator 120 to supply voltage, in order to meet the requirements of data center expansion, relocation, rectification, etc.

The apparatus for controlling battery module in the power supply device of the embodiments of the present disclosure may be described in details below with reference to FIGS. 4-10.

Figure 4:
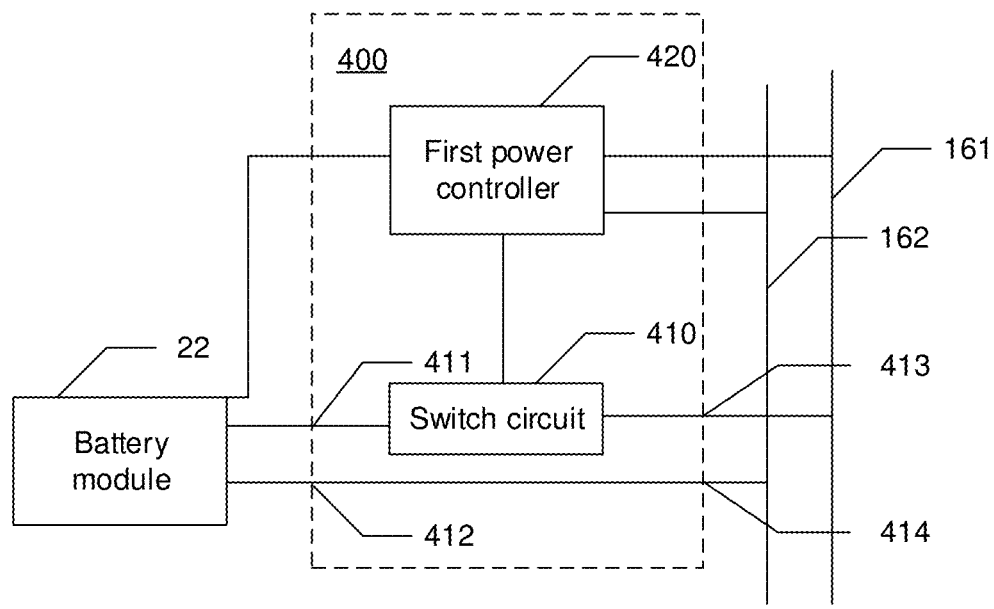
FIG. 4 is a schematic structural diagram of an apparatus for controlling battery module according to an embodiment of the present disclosure.

FIG. 4 is a schematic structural diagram of an apparatus for controlling battery module according to an embodiment of the present disclosure.

As shown in FIG. 4, the apparatus 400 for controlling battery module according to the embodiment may include a switch circuit 410 and a first power controller 420.

The apparatus 400 for controlling battery module may include, for example, four interfaces. Two of the four interfaces form a pair of interfaces, and the other two interfaces form another pair of interfaces. A pair of interfaces include a first positive interface 411 and a first negative interface 412, and the two interfaces are used to couple the battery module 22. The other pair of interfaces include a second positive interface 413 and a second negative interface 414. The second positive interface 413 is used to couple with the positive busbar of the first busbar 161 and the second busbar 162, and the second negative interface 414 is used to couple with the negative busbar of the first busbar 161 and the second busbar 162. By using the four interfaces, the switch circuit 410 may be coupled with the battery module 22, the first busbar 161 and the second busbar 162, so that the conductive loop including the switch circuit 410, the battery module 22, the first busbar 161, and the second busbar 162 may be formed.

In order to control the switch circuit 410, the first power controller 420 is coupled with the switch circuit 410. The first power controller 420 may be coupled with an electrical component in the switch circuit 410, for example, to change the conduction direction of the switch circuit 410 by controlling the electrical component.

According to an embodiment of the present disclosure, the first power controller 420 may further be coupled with the battery module 22, the first busbar 161 and the second busbar 162, in order to control the charging and discharging of the battery module 22. Specifically, the first power controller 420 may be coupled with the second power controller in the battery module 22 via a communication interface to receive the voltage and power of the lithium battery pack in the battery module 22 detected by the second power controller, and the total voltage and the total power of the lithium battery pack are used as the voltage and power of the battery module 22.

According to an embodiment of the present disclosure, the first power controller 420 may be coupled to the first busbar 161 and the second busbar 162, to detect the voltage between the first busbar 161 and the second busbar 162. In an example, the first power controller 420 may be not coupled to the first busbar and the second busbar, and automatic charging and discharging of the battery module may be achieved by using current flow (from high potential to low potential) and preset control logic of the switch circuit.

In related technologies, in order to control the automatic charging and discharging of the battery module in the power supply device, generally the power supply device is equipped with a high-voltage control box, which is coupled with the UPS/HVDC and the battery module in series, such that charging and discharging of the battery module may be controlled by the UPS/HVDC. Therefore, the coupling between UPS/HVDC and power supply device is relatively strong. If the power system fails to be charged and discharged as expected, it is difficult to determine the position causing the fault (at the power supply device or UPS/HVDC) accurately.

In an embodiment of the present disclosure, an apparatus for controlling battery module including the switch circuit 410 and the first power controller 420 may be implemented as a high voltage control box, such that the coupling degree of the UPS/HVDC and the power supply device is reduced, thereby reducing the difficulty of fault location. Charging and discharging of the battery module 22 may be controlled through controlling the switch circuit 410 by the first power controller 420, without the aid of the UPS/HVDC. Furthermore, by coupling the apparatus for controlling battery module with the UPS/HVDC in parallel through the busbars which are led out from the UPS/HVDC, it is convenient to locate whether the fault exists at the apparatus for controlling battery module.

By integrating the first power controller 420 and the switch circuit 410 in the same device, the present disclosure can also effectively control the number of interfaces of the apparatus 400 for controlling battery module, avoiding the problem of poor maintenance due to complicated wiring between the apparatus 400 for controlling battery module and external devices.

According to an embodiment of the present disclosure, in order to switch between the charging mode and the discharging mode of the apparatus 400 for controlling battery module, the switch circuit 410 may include, for example, a first branch and a second branch. The first branch may be conducted in the first direction under the control of the first power controller 420, and the second branch may be conducted in the second direction under the control of the first power controller 420.

The switch circuit may be described in details below with reference to FIGS. 5-6.

Figure 5:
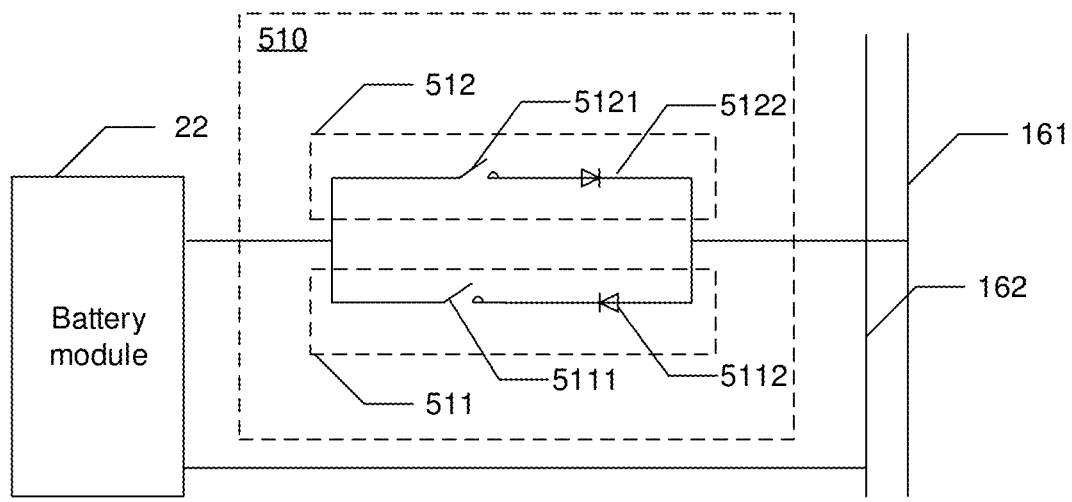
FIG. 5 is a schematic structural diagram of a switch circuit according to an embodiment of the present disclosure.

FIG. 5 is a schematic structural diagram of a switch circuit according to an embodiment of the present disclosure.

As shown in FIG. 5, the switch circuit 510 includes a first branch 511 and a second branch 512. The first branch 511 has a control end, a first end, and a second end. The control end of the first branch 511 is coupled with the first power controller, to turn on and turn off the switch circuit in the first direction under the control of the first power controller. The first end of the first branch 511 is used to couple with the battery module 22, and the second end of the first branch 511 is used to couple with the first busbar 161. The first busbar 161 may be a positive busbar or a negative busbar. The second branch 512 has a control end, a first end, and a second end. The control end of the second branch 512 is coupled with the first power controller, to turn on and turn off the switch circuit 510 in the second direction under the control of the first power controller. The first end of the second branch 512 is used to couple with the battery module, and the second end of the second branch 512 is used to couple with the first busbar 161. The first busbar 161 may be a positive busbar or a negative busbar.

By providing the first branch 511 and the second branch 512, the first power controller may conduct the first branch and cutoff the second branch 512 if the voltage between the first busbar and the second busbar is greater than the voltage of the battery module and the power of the battery module is smaller than the first preset power. The first power controller may conduct the second branch and cutoff the first branch, if the voltage between the first busbar and the second busbar is smaller than the voltage of the battery module and the power of the battery module is greater than the second preset power.

For example, as shown in FIG. 5, the first branch 511 may include a first contactor 5111 and a first diode 5112 coupled in series. In case that the first busbar 161 is a positive busbar, the control end of the first contactor 5111 is coupled with the first power controller 420, and the first end of the first contactor 5111 is coupled with the battery module 22. The negative electrode of the first diode 5112 is coupled with the second end of the first contactor 5111, and the positive electrode of the first diode 5112 is coupled with the first busbar 161. The first power controller may conduct or cutoff the first branch 511 by turning on or turning off the first contactor 5111. Due to the set of the first diode 5112, the current is allowed to flow from the first busbar acting as the positive busbar to the battery module when the first branch 511 is conducted, so that the switch circuit may be conducted in the first direction. It can be understood that the location of the first contactor 5111 and the location of the first diode 5112 in FIG. 5 may be interchanged.

For example, as shown in FIG. 5, the second branch 512 may include a second contactor 5121 and a second diode 5122 coupled in series. In case that the first busbar 161 being a positive busbar, the control end of the second contactor 5121 is coupled with the first power controller 420, and the first end of the second contactor 5121 is coupled with the battery module. The positive electrode of the second diode 5122 is coupled with the second end of the second contactor 5121, and the negative electrode of the second diode 5122 is coupled with the first busbar 161. The first power controller may conduct or cutoff the second branch 512 by turning on or turning off the second contactor 5121. Due to the set of the second diode 5122, the current is allowed to flow from the battery module to the first busbar 161 acting as the positive busbar when the second branch 512 is conducted, so that the switch circuit 510 may be conducted in the second direction. It can be understood that the location of the second contactor 5121 and the location of the second diode 5122 in FIG. 5 may be interchanged.

It can be understood that in case that the first busbar 161 is a negative busbar, the coupling of the first busbar 161 with the switch circuit 510 is unchanged. The difference is that when the first branch 511 in FIG. 5 is conducted, the conducting direction of the switch circuit 510 is changed from the first direction to the second direction. When the second branch 512 in FIG. 5 is conducted, the conducting direction of the switch circuit 510 is changed from the second direction to the first direction.

By providing the first branch 511 and the second branch 512, the first power controller under the charging mode may turn on the first contactor 5111 in the first branch 511 and turn off the second contactor 5121 in the second branch 512, so that the switch circuit 510 is conducted in the first direction. Under the discharging mode, the first power controller may turn off the first contactor 5111 in the first branch 511 and turn on the second contactor 5121 in the second branch 512, so that the switch circuit 510 is conducted in the second direction.

According to an embodiment of the present disclosure, the diode provided in the conductive loop may generate large heat and may be easy to burn if the current flows through the diode for a long time. In order to avoid this situation, in the embodiment, a high-power diode may be selected. For example, considering that the current is generally large during discharge, the first diode 5112 may be a diode having a rated power greater than or equal to the rated power of the battery module, to reduce power loss and extend the service life of the diode.

According to an embodiment of the present disclosure, the diode provided in the conductive loop may generate large heat and may consume large power if the current flows through the diode for a long time. In order to avoid this problem, the first branch and the second branch of the present disclosure may be set as shown in FIG. 6.

Figure 6:
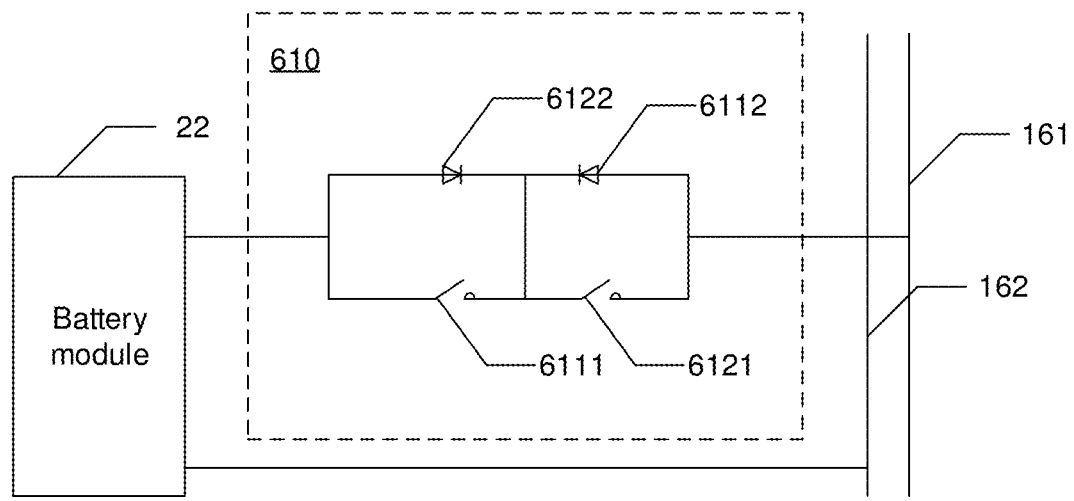
FIG. 6 is another schematic structural diagram of a switch circuit according to an embodiment of the present disclosure.

FIG. 6 is another schematic structural diagram of a switch circuit according to an embodiment of the present disclosure.

As shown in FIG. 6, the first branch in the switch circuit 610 includes a first contactor 6111 and a first diode 6112. The second branch includes a second contactor 6121 and a second diode 6122.

For example, as shown in FIG. 6, in case that the first busbar 161 is used as the positive busbar, the control end of the first contactor 6111 is coupled with the first power controller, and the first end of the first contactor 6111 is coupled with the battery module. The second end of the first contactor 6111 is coupled with the negative electrode of the first diode 6112, and the positive electrode of the first diode 6112 is coupled with the first busbar 161. The control end of the second contactor 6121 is coupled with the first power controller, the first end of the second contactor 6121 is coupled with the second end of the first contactor 6111, and the second end of the second contactor 6121 is coupled with the first busbar 161. The positive electrode of the second diode 6122 is coupled with the first end of the first contactor 6111, and the negative electrode of the second diode 6122 is coupled with the first end of the second contactor 6121.

For example, in case that the first busbar 161 is used as the negative busbar, the connection relationship of the first contactor 6111, the second contactor 6121, the first diode 6112, and the second diode 6122 is the same as that of FIG. 6. The difference is that, in this case, the first branch includes the second diode 6122 and the second contactor 6121, and the second branch includes the first diode 6112 and the first contactor 6111.

With the switch circuit 610, the first power controller may turn on the first contactor 6111 and turn off the second contactor 6121 to cause the switch circuit 610 to conduct in the first direction under the charging mode, in case that the first busbar 161 is a positive busbar. Under the discharging mode, the first power controller may turn off the first contactor 6111 and turn on the second contactor 6121, to cause the switch circuit 610 to conduct in the second direction.

In summary, with the switch circuits in FIGS. 5 and 6, the separation and control of the charging and discharging circuits can be achieved, thereby ensuring reliable switching between the charging mode and the discharging mode.

According to an embodiment of the present disclosure, with the switch circuit 610 in FIG. 6, the first contactor 6111 and the second contactor 6121 may be turned on simultaneously in the case of the charging current being relatively large under the charging mode, or in the case of the discharging current being relatively large under the discharging mode, thereby reducing power consumption. In this manner, the power loss caused by the current flowing through the first diode 6112 or the second diode 6122 for a long time may be avoided. The apparatus for controlling battery module may further be equipped with a current sensor in the conductive loop, in order to determine the current in the conductive loop.

Figure 7:
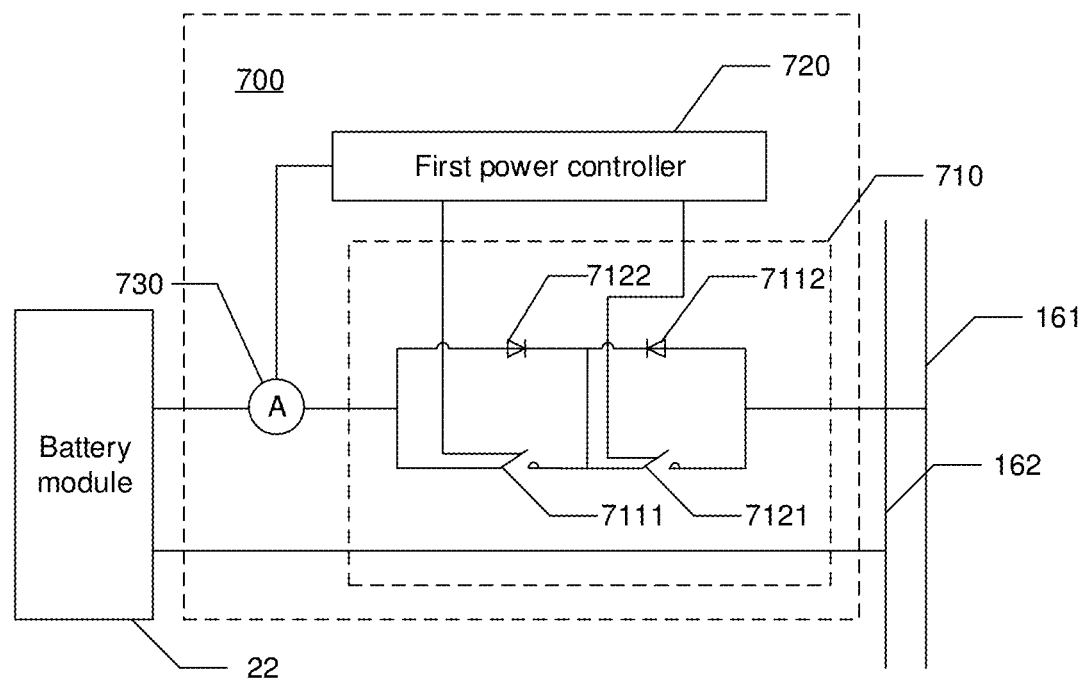
FIG. 7 is a schematic circuit structural diagram of an apparatus for controlling battery module according to an embodiment of the present disclosure.

FIG. 7 is a schematic circuit structural diagram of an apparatus for controlling battery module according to an embodiment of the present disclosure.

As shown in FIG. 7, the apparatus 700 for controlling battery module of the embodiment includes a current sensor 730 in addition to the first power controller 720 and the switch circuit 710. The current sensor 730 is coupled with the first power controller 720. The current sensor 730 may detect the current in the conductive loop and provide the detected current to the first power controller 720.

During charging or discharging, the current in the conductive loop gradually increases until reaching a stable current. If the current is small, the power loss of the diode is small. However, as the current gradually increases, the power loss of the diode gradually increases as well. In the embodiment, under the charging mode, the first power controller may further turn on the second contactor 7121 if the current detected by the current sensor 730 is greater than a first preset current after turning on the first contactor 7111 and turning off the second contactor 7121, such that the first diode 7112 and the second diode 7122 are in a short-circuit state, and the current only flows through the two contactors. Similarly, under the discharging mode, the first power controller may further turn on the first contactor 7111 if the current detected by the current sensor 730 is greater than a second preset current, after turning on the second contactor 7121 and turning off the first contactor 7111.

For example, the apparatus 700 for controlling battery module may be in a standby state, wherein the first contactor 7111 is turned off and the second contactor 7121 is turned on. The first power controller 720 monitors the current detected by the current sensor 730 in real time. If the voltage between the first busbar 161 and the second busbar 162 is smaller than the voltage of the battery module 22, the current in the conductive loop flows in the second direction and gradually increases. If the current is greater than the second preset current, the first contactor 7111 may be turned on, causing the battery module to supply power to the first busbar 161 and the second busbar 162 via the conductive loop.

Upon the battery module supplies power, i.e., under the discharging mode where the first contactor 7111 and the second contactor 7121 are both turned on, the first power controller 720 may monitor the power of the battery module 22 in real time, in order to avoid over-discharging of the battery module. In response to the monitored power of the battery module 22 being smaller than the fourth preset power, the second contactor 7121 is turned off, so that the battery module 22 may no longer supply power. The fourth preset power may be close to zero. For example, the fourth preset power may be 0.1 Ah, 0.2 Ah, etc. The fourth preset power may be set as desired in practice.

After the second contactor 7121 is turned off, the current in the conductive loop flows in the first direction and gradually increases, if the voltage between the first busbar 161 and the second busbar 162 is greater than the voltage of the battery module 22. If the current is greater than the first preset current, the second contactor 7121 may be turned on, so that the apparatus 700 for controlling battery module may charge the battery module 22 via the conductive loop by using the voltage between the first busbar 161 and the second busbar 162.

After the battery module is charged, i.e., under the charging mode and the first contactor 7111 and the second contactor 7121 are both turned on, the first power controller 720 may monitor the power of the battery module in real time, in order to avoid overcharging of the battery module 22. In response to the monitored power of the battery module 22 being greater than the third preset power, the first contactor 7111 is turned off, so that the battery module 22 may no longer charge. The third preset power may be close to the rated power of the battery module 22. The third preset power may be set as desired in practice.

According to an embodiment of the present disclosure, when the first contactor 7111 or the second contactor 7121 fails to be conducted due to a fault, the current would flow through the diode for a long time during the charging and discharging process, causing the diode to suffer from being burned and causing the charging and discharging of the battery module 22 to be unstable. To avoid this situation, the rated power of at least one of the first diode 7112 and the second diode 7122 may be greater than or equal to the rated power of the battery module 22 in the embodiment, thereby prolonging the service life of the diode in the switch circuit. For example, considering that the current is relatively large during discharge, only the first diode 7112 may be selected as the diode having rated power greater than or equal to the rated power of the battery module 22. By selecting high-power diodes, the apparatus 700 for controlling battery module may have a double discharging circuit or a double charging circuit, so that the stability and reliability of the apparatus 700 for controlling battery module may be improved, avoiding failure of charging and discharging due to a single point fault of the apparatus 700 for controlling battery module.

According to an embodiment of the present disclosure, the apparatus for controlling battery module may be provided with an adjusting circuit to reduce the current in the circuit, so as to preventing the capacitive power consuming device from being damaged due to excessive output current when the apparatus for controlling battery module enters the discharging mode.

Figure 8:
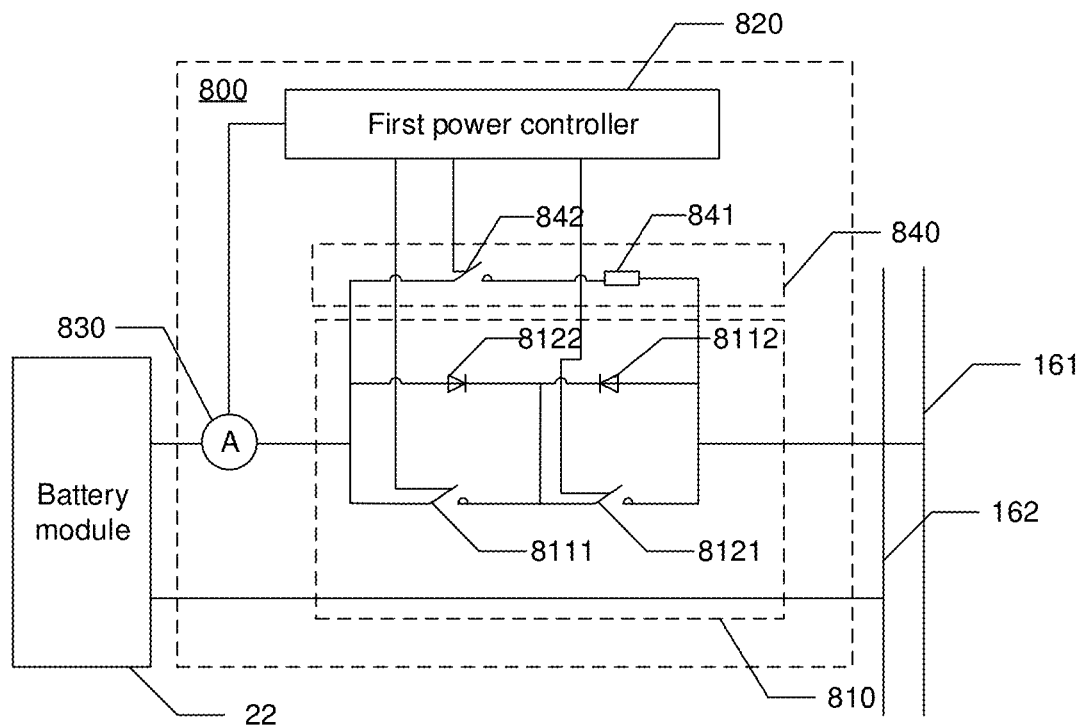
FIG. 8 is another schematic circuit structural diagram of an apparatus for controlling battery module according to an embodiment of the present disclosure.

FIG. 8 is another schematic circuit structural diagram of an apparatus for controlling battery module according to an embodiment of the present disclosure.

As shown in FIG. 8, the apparatus 800 for controlling battery module according to the embodiment includes an adjusting circuit 840 in addition to the first power controller 820, the switch circuit 810, and the current sensor 830. The adjusting circuit 840 includes a resistor 841. A first end of the resistor 841 is coupled with the first end of the first contactor 8111, and a second end of the resistor 841 is coupled with the second end of the second contactor 8121.

The first power controller may turn off the first contactor 8111 and the second contactor 8121 if the current detected by the current sensor is greater than a third preset current, so as to prevent the power consuming device from being damaged by excessive current. Thus, the adjusting circuit 840 may form a conductive loop with the battery module, the first busbar 161 and the second busbar 162. Due to the setting of the resistor 841 in the conductive loop, the current flowing to the first busbar 161 and the second busbar 162 is smaller than the current flowing through the switch circuit. The third preset current may be set according to the startup current of the power consuming device. The resistance of the resistor may be determined according to the rated current and rated voltage of the battery module 22 and the startup current of the power consuming device.

According to an embodiment of the present disclosure, in the startup process of a plurality of power supply devices in the power supply system, the plurality of power supply devices are started up in sequence. In this case, the current on the first busbar 161 and the second busbar 162 flows to the later-started power supply device having low voltage of the battery module, due to the high voltage of the battery module of the earlier-started power supply device, such that the electronic component in the later-started power supply device suffers from being damaged due to the large current in the circuit. In order to avoid this situation, it is possible to determine a first difference between the voltage between the first busbar 161 and the second busbar 162 and the voltage of the battery module in the power supply device of the device, when the apparatus for controlling battery module starting up the power supply device of the device. If the first difference is greater, the current flowing through the apparatus 800 for controlling battery module may be greater. Therefore, the first power controller 820 may turn off the first contactor 8111 and the second contactor 8121 if the first difference is greater than a first preset difference, to cause the current to flow through the adjusting circuit, thereby reducing the current flowing into the apparatus for controlling battery module.

For example, as shown in FIG. 8, in addition to the resistor 841, the adjusting circuit 840 may further include a third contactor 842 coupled with the resistor 841 in series to avoid power loss due to part of the current flowing through the adjusting circuit 840 in a case of a need for the current to flow through the switch circuit 810 due to the resistor 841 being relatively small. The first end of the resistor 841 is coupled with the first end of the first contactor 8111 via the third contactor 842. In another embodiment, the second end of the resistor 841 may further be coupled with the second end of the second contactor 8121 via the third contactor 842. In order to enable the first power controller 820 to turn on and turn off the third contactor 842, a control end of the third contactor 842 may be coupled with the first power controller 820. In this case, the first power controller 820 may further turn off the first contactor 8111 and the second contactor 8121 and turn on the third contactor 842, if the current detected by the current sensor 830 is greater than the third preset current or the first difference between the voltage between the first busbar 161 and the second busbar 162 and the voltage of the battery module is greater than the first preset difference. In addition, in the case of the first contactor 8111 and/or the second contactor 8121 are turned on, the third contactor 842 is turned off.

According to an embodiment of the present disclosure, in case that a plurality of power supply devices are provided in the power supply system, the first power controller 820 may further turn on the first contactor 8111 and the second contactor 8121 in response to receiving a discharging instruction transmitted by the third power controller; and turn off the first contactor 8111 and the second contactor 8121 in response to receiving a charging instruction. In this manner, the power of the battery modules in the plurality of power supply devices is relatively balanced, and damage of the electronic components due to the large current may be avoided when the first power supply device is supplying power to the second power supply device. The current output by the power supplying of the charging device of the plurality of power supply devices may flow into the battery module in the charged device via the adjusting circuit in the charged device.

According to an embodiment of the present disclosure, a circuit breaker controlled by the first power controller may further be provided in the apparatus for controlling battery module, so as to improve the stability of the apparatus for controlling battery module, avoiding the overcharging or over-discharging of the battery module caused by failing to turn off the first contactor and the second contactor. This will be described in details below with reference to FIG. 9.

Figure 9:
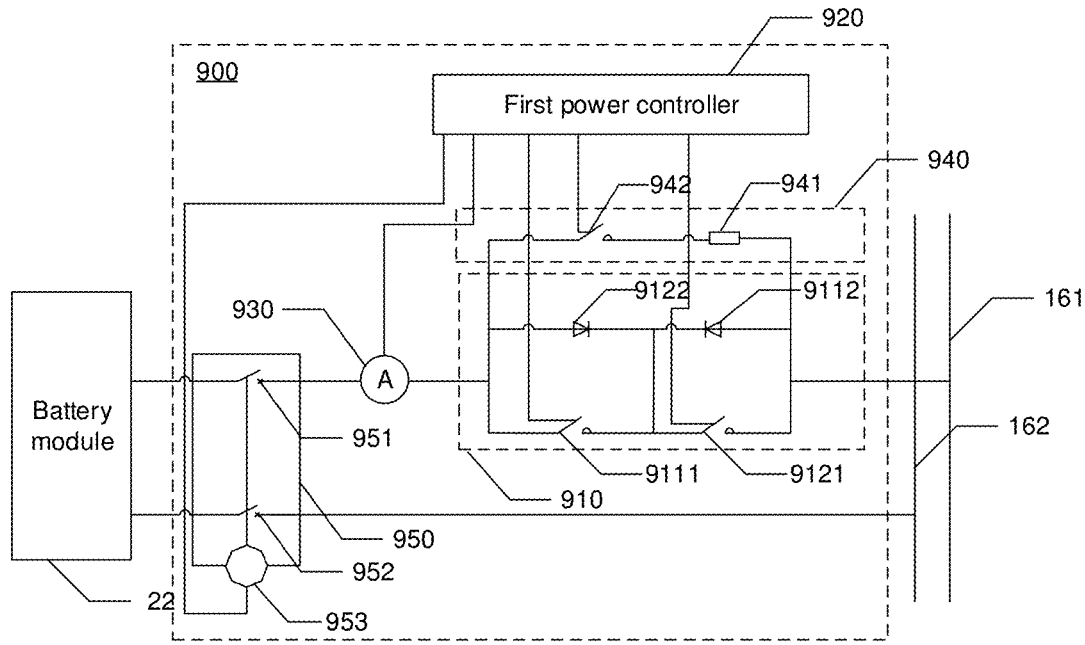
FIG. 9 is another schematic circuit structural diagram of an apparatus for controlling battery module according to an embodiment of the present disclosure.

FIG. 9 is another schematic circuit structural diagram of an apparatus for controlling battery module according to an embodiment of the present disclosure.

As shown in FIG. 9, the apparatus 900 for controlling battery module according to the embodiment may include a circuit breaker 950 in addition to the first power controller 920, the switch circuit 910, the current sensor 930, and the adjusting circuit 940. Alternatively, the apparatus 900 for controlling battery module may only include the first power controller 920, the switch circuit 910, and the circuit breaker 950. Alternatively, in addition to the first power controller 920, the switch circuit 910, and the circuit breaker 950, one of the current sensor 930 and the adjusting circuit 940 may be included.

The circuit breaker 950 is coupled in the conductive loop and coupled with the first power controller 920, so that the circuit breaker 950 can not only switch from the conductive state to the cutoff state if the current being excessive, but also switch from the conductive state to the cutoff state under the control of the first power controller 920 if the first power controller 920 determines that the first contactor 9111 or the second contactor 9121 fails to be turned off as expected.

After the first power controller 920 turns off the first contactor 9111, it is possible to determine whether the first contactor 9111 can be turned off as expected, according to a voltage between the first end of the first contactor 9111 and the second end of the first contactor 9111. Similarly, after the first power controller 920 turns off the second contactor 9121, it is possible to determine whether the second contactor 9121 can be turned off as expected according to a voltage between the first end of the second contactor 9121 and the second end of the second contactor 9121. If the contactor is turned off, the voltage between the first end and the second end is relatively large. If the contactor is not turned off, the voltage between the first end and the second end is very small and close to zero. Therefore, the first power controller 920 may detect the voltage between the first end of the first contactor 9111 and the second end of the first contactor 9111 after turning off the first contactor 9111, and control the circuit breaker 950 to switch from a conductive state to a cutoff state if the voltage between the first end of the first contactor 9111 and the second end of the first contactor 9111 is smaller than a first preset voltage. Similarly, the first power controller 920 may further detect the voltage between the first end of the second contactor 9121 and the second end of the second contactor 9121 after turning off the second contactor 9121, and control the circuit breaker 950 to switch from a conductive state to a cutoff state if the voltage between the first end of the second contactor 9121 and the second end of the second contactor 9121 is smaller than a second preset voltage.

In an example, the circuit breaker 950 of a single-breakpoint structure may be employed, i.e., the circuit breaker 950 has a pair of contacts, and the switch circuit is coupled with the battery module via the pair of contacts.

In an example, the circuit breaker 950 of a double-breakpoint structure as shown in FIG. 9 may be employed, i.e. the circuit breaker 950 includes a first pair of contacts 951 and a second pair of contacts 952. The first pair of contacts 951 are coupled between the battery module and the switch circuit 910. The first pair of contacts 951 may be electrically contacted with each other in case of the circuit breaker 950 is in a conductive state and may be electrically isolated from each other in a case of the circuit breaker 950 is in a cutoff state. The second pair of contacts 952 are coupled between the battery module and the second busbar. The second pair of contacts 952 may be electrically contacted with each other in case of the circuit breaker 950 is in a conductive state, and may be electrically isolated from each other in case of the circuit breaker 950 is in a cutoff state.

In an example, the circuit breaker may further be provided with an operating assembly 953 in order to improve the maintainability and operability of the apparatus for controlling battery module. The operating assembly may be an operating handle or operating button mechanically coupled with the first pair of contacts 951 and the second pair of contacts 952. In response to the user's operation, the operating assembly may cause the first pair of contacts 951 to be electrically isolated from each other while cause the second pair of contacts 952 to be electrically isolated from each other, such that the circuit breaker 950 is in a cutoff state; or the operating assembly may cause the first pair of contacts 951 to be electrically contacted with each other while cause the second pair of contacts 952 to electrically contacted with each other, such that the circuit breaker 950 is in a conductive state. The circuit breaker provided with the operating assembly 953 is a manual conductive circuit breaker. In need of startup, the apparatus for controlling battery module may be started up by manually turning on the circuit breaker 950. In need of maintenance, the circuit breaker 950 may be manually turned off, or the first power controller 920 may switch the circuit breaker 950 to the cutoff state. In case that the operating assembly 953 is included, the circuit breaker 950 may be specifically coupled with the first power controller 920 via the operating assembly 953.

In an embodiment of the present disclosure, a circuit breaker having an operating assembly is provided in the apparatus for controlling battery module, and a manual switch may be provided for the apparatus for controlling battery module, thereby meeting the needs of data center maintenance. Moreover, by controlling the cutoff of the circuit breaker by the first power controller, the safety and stability of the entire device can be improved, avoiding the reduction of lifetime of the battery module caused by failing to turn off the contactor.

According to an embodiment of the present disclosure, the apparatus for controlling battery module may further be provided with a toggle circuit, so that it is possible to connect the first power controller to an external power supply and battery module selectively to supply uninterruptible power to the first power controller. If the external power supply is supplying power as expected, the external power supply is selected to supply power to the first power controller. If the external power supply fails to supply power as expected, it is automatically switched to the battery module to supply power to the first power controller. This may be described in details below with reference to FIG. 10.

Figure 10:
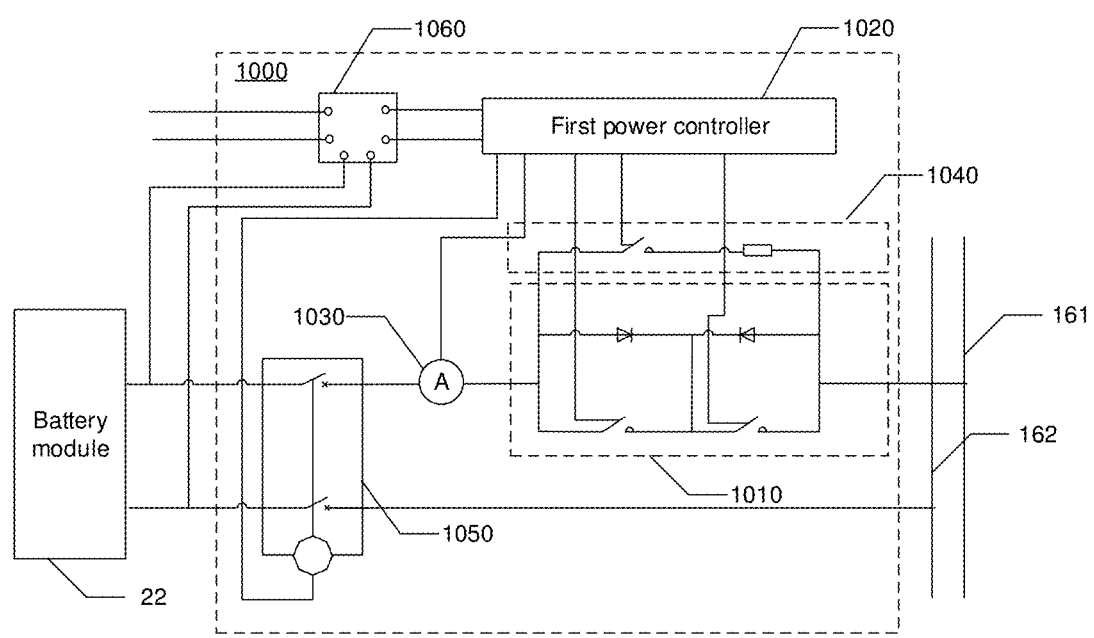
FIG. 10 is another schematic circuit structural diagram of an apparatus for controlling battery module according to an embodiment of the present disclosure.

FIG. 10 is another schematic circuit structural diagram of an apparatus for controlling battery module according to an embodiment of the present disclosure.

As shown in FIG. 10, the apparatus 1000 for controlling battery module of the embodiment may include a toggle circuit 1060 in addition to the first power controller 1020 and the switch circuit 1010. Alternatively, the apparatus 1000 for controlling battery module may further include at least one of a current sensor 1030, an adjusting circuit 1040, and a circuit breaker 1050.

The toggle circuit 1060 is coupled with the first power controller 1020, the battery module and an external power supply. The toggle circuit 1060 may couple one of the battery module and the external power supply to the first power controller 1020 under a control of the first power controller 1020.

For example, the toggle circuit 1060 may include a toggle switch, a first power branch, and a second power branch. The first power branch is conductively coupled with the toggle switch. The first power branch may be coupled with the external power supply. In order to facilitate power supply to the first power controller 1020, an AC/DC converter may be provided in the first power branch to convert an alternating current voltage supplied by the external power supply into a direct current voltage required by the first power controller 1020. The second power branch may be coupled with the battery module. In order to facilitate power supply to the first power controller 1020, a DC/DC converter may be set in the second power branch to convert a direct current voltage output by the battery module to a direct current voltage required by the first power controller 1020.

For example, the first power controller 1020 may further detect a voltage of the external power supply, and in a case of the voltage of the external power supply being smaller than a third preset voltage, couple the battery module to the first power controller, and in a case of the voltage of the external power supply being greater than or equal to the third preset voltage, couple the battery module to the external power supply. The third preset voltage may be determined according to the rated voltage of the battery module. For example, the third preset voltage may be set to be smaller than the rated voltage of the battery module by a certain amount. The certain amount may be 5V, 10V, etc., and the third preset voltage may be set as desired in practice, and is not limited in the present disclosure. By setting the toggle circuit, the first power controller may automatically select the external power supply to supple power if the external power supply is supplying power as expected, and the system may automatically switch to be supplied by the battery module if there being no external power supply. In this way, when the external power supply fails to supply power as expected, the first power controller 1020 may be coupled with the battery module immediately in order to be powered by the battery module.

The embodiment of the present disclosure also provides a method of controlling battery module, and the method may be performed by the apparatus for controlling battery module of any of the above embodiments.

Figure 11:
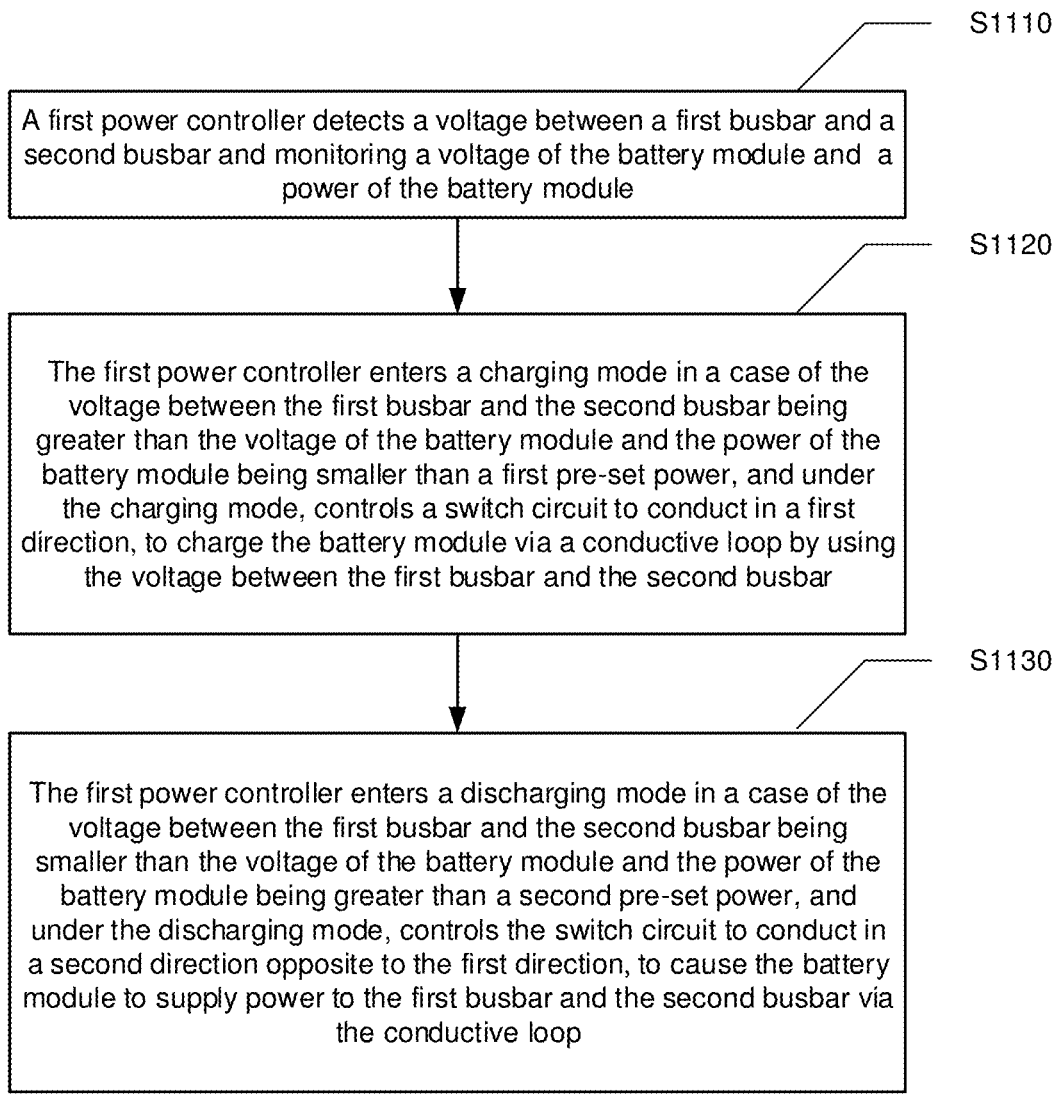
FIG. 11 is a flowchart of a method of controlling battery module performed by an apparatus for controlling battery module according to an embodiment of the present disclosure.

FIG. 11 is a flowchart of a method of controlling battery module performed by an apparatus for controlling battery module according to an embodiment of the present disclosure. As shown in FIG. 11, the method 1100 of controlling battery module of the embodiment may include operations S1110 to S1130.

In operation S1110, a voltage between a first busbar and a second busbar is detected by a first power controller and a voltage and a power of the battery module are monitored by a first power controller.

In operation S1120, in a case of the voltage between the first busbar and the second busbar being greater than the voltage of the battery module and the power of the battery module being smaller than a first preset power, the first power controller enters a charging mode, and under the charging mode, the first power controller controls a switch circuit to conduct in a first direction, to charge the battery module via a conductive loop by using the voltage between the first busbar and the second busbar.

In operation S1130, in a case of the voltage between the first busbar and the second busbar being smaller than the voltage of the battery module and the power of the battery module being greater than a second preset power, the first power controller enters a discharging mode, and under the discharging mode, the first power controller controls the switch circuit to conduct in a second direction opposite to the first direction, to cause the battery module to supply power to the first busbar and the second busbar via the conductive loop.

Based on the apparatus for controlling battery module described above, the method of controlling battery module in FIG. 11 may be described in details below with reference to FIG. 12.

Figure 12:
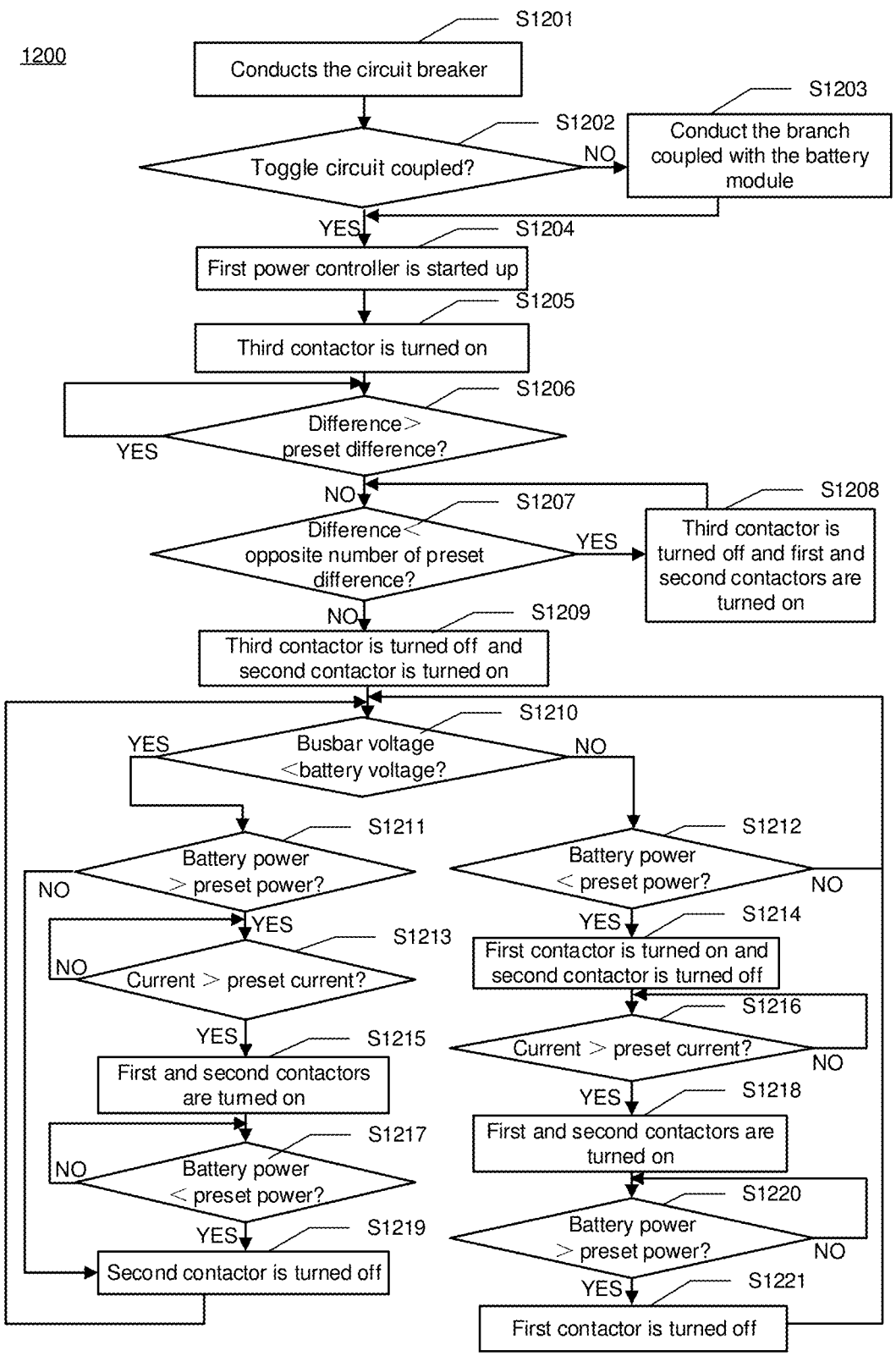
FIG. 12 is another flowchart of a method of controlling battery module according to an embodiment of the present disclosure.

FIG. 12 is another flowchart of a method of controlling battery module according to an embodiment of the present disclosure.

As shown in FIG. 12, when starting up the power supply device including the apparatus for controlling battery module and the battery module, the controlling method 1200 of the apparatus for controlling battery module includes the following operations S1201 to S1221.

In operation S1201, in response to a manual operation to the circuit breaker, the circuit breaker is conducted.

In operation S1202, it is determined whether the toggle circuit is coupled with the external power supply according to a voltage of an interface coupled with an external AC power supply in a toggle circuit. If the toggle circuit is coupled with the external power supply, operation S1204 may be performed. If the toggle circuit is not coupled with the external power supply, operation S1203 may be performed.

In operation S1203, the toggle circuit is controlled to conduct the branch coupled with the battery module, and operation S1204 may be performed.

In operation S1204, the first power controller is started up.

In operation S1205, the third contactor is turned on by the first power controller to turn on an adjusting circuit having a resistor.

In operation S1206, it is determined whether a first difference between a voltage between the first busbar and the second busbar and the voltage of the battery module is greater than a first preset difference. If the first difference between the voltage between the first busbar and the second busbar and the voltage of the battery module is greater than the first preset difference, no operation may be performed, the toggle circuit may be kept on to cause other started power supply device to charge for the battery module of the current power supply device, and operation S1206 may be periodically returned to be performed. If the first difference between the voltage between the first busbar and the second busbar and the voltage of the battery module is not greater than the first preset difference, operation S1207 may be performed.

In operation S1207, it is determined whether the first difference between the voltage between the first busbar and the second busbar and the voltage of the battery module is smaller than an opposite number of the first preset difference. If the first difference between the voltage between the first busbar and the second busbar and the voltage of the battery module is smaller than the opposite number of the first preset difference, operation S1208 may be performed, and the process may return to operation S1207 periodically. If the first difference between the voltage between the first busbar and the second busbar and the voltage of the battery module is not smaller than the opposite number of the first preset difference, operation S1209 may be performed.

In operation S1208, the third contactor is turned off and the first contactor and the second contactor are turned on by the first power controller, in order to supply power to the battery module of the started power supply device.

In operation S1209, the third contactor is turned off and the second contactor is turned on by the first power controller to cause an apparatus for controlling battery module to be in a standby mode.

When the battery module is in a standby mode, operation S1210 is periodically performed.

In operation S1210, it is determined whether the voltage between the first busbar and the second busbar is smaller than the voltage of the battery module. If the voltage between the first busbar and the second busbar is smaller than the voltage of the battery module, operation S1211 may be performed. If the voltage between the first busbar and the second busbar is not smaller than the voltage of the battery module, operation S1212 may be performed.

In operation S1211, it is determined whether the power of the battery module is greater than a second preset power. If the power of the battery module is greater than the second preset power, operation S1213 may be performed. If the power of the battery module is not greater than the second preset power, operation S1219 may be performed.

In operation S1212, it is determined whether the power of the battery module is smaller than a first preset power. If the power of the battery module is smaller than the first preset power, operation S1214 may be performed. If the power of the battery module is not smaller than the first preset power, the process may return to operation S1210 periodically.

In operation S1213, it is determined whether a current in the conductive loop is greater than a second preset current. If the current in the conductive loop is greater than the second preset current, operation S1215 may be performed. If the current in the conductive loop is not greater than the second preset current, the process may return to operation S1213 periodically.

In operation S1214, the first contactor is turned on and the second contactor is turned off by the first power controller to cause the apparatus for controlling battery module to supply power to the battery module by using the voltage between the first busbar and the second busbar. Then operation S1216 may be performed.

In operation S1215, both the first contactor and the second contactor are turned on by the first power controller to cause the apparatus for controlling battery module to supply power to the first busbar and the second busbar via the conductive loop. Then operation S1217 may be performed.

In operation S1216, it is determined whether the current in the conductive loop is greater than a first preset current. If the current in the conductive loop is greater than the first preset current, operation S1218 may be performed. If the current in the conductive loop is not greater than the first preset current, operation S1216 may be periodically performed.

In operation S1217, it is determined whether the power of the battery module is smaller than a fourth preset power. If the power of the battery module is smaller than the fourth preset power, operation S1219 may be performed. If the power of the battery module is not smaller than the fourth preset power, operation S1217 may be periodically performed.

In operation S1218, the first contactor and the second contactor are turned on by the first power controller, and operation S1220 may be performed.

In operation S1219, the second contactor is turned off by the first power controller, and the process may return to operation S1210.

In operation S1220, it is determined whether the power of the battery module is greater than a third preset power. If the power of the battery module is greater than the third preset power, operation S1221 may be performed. If the power of the battery module is not greater than the third preset power, the process may return to operation S1220 periodically.

In operation S1221, the first contactor is turned off by the first power controller, and the process may return to operation S1210.

It can be understood that the process may return to operation S1210 during operations after the operation S1210, and the process may return to operation S1210 after the power supply device is started up. Before the apparatus for controlling battery module is started up, the first contactor, the second contactor and the third contactor are all turned off. When the apparatus for controlling battery module is initially started up, the power of the battery module is generally greater than the second preset power.

It should be understood that the various forms of processes described above may be used by reordering, adding or deleting steps. For example, each operation recorded in the present disclosure may be performed in parallel, in sequence or in different orders, as long as the performance can realize an expected outcome of the technical solutions of the present disclosure, and is not limited in the present disclosure.

The detailed description described above does not constitute a limitation on the protection scope of the present disclosure. Those skilled in the art should be noted that according to design requirements and other factors, various modifications, combinations, sub-combinations and substitutions can be made. Any modifications, equivalent substitutions and improvements made within the spirit and principles of the present disclosure should be included in the scope of the protection of the present disclosure.

We claim:

1. An apparatus for controlling a battery module, comprising:
   a switch circuit, coupled with the battery module in series between a first busbar and a second busbar, to form a conductive loop comprising the switch circuit, the battery module, the first busbar, and the second busbar; and
   a first power controller, coupled with the switch circuit, the battery module, the first busbar, and the second busbar, and configured to:
      detect a voltage between the first busbar and the second busbar, and monitor a voltage and a power of the battery module;
      enter a charging mode in a case of the voltage between the first busbar and the second busbar being greater than the voltage of the battery module and the power of the battery module being smaller than a first preset power, and under the charging mode, control the switch circuit to conduct in a first direction, to charge the battery module via the conductive loop by using the voltage between the first busbar and the second busbar; and
      enter a discharging mode in a case of the voltage between the first busbar and the second busbar being smaller than the voltage of the battery module and the power of the battery module being greater than a second preset power, and under the discharging mode, control the switch circuit to conduct in a second direction opposite to the first direction, to cause the battery module to supply power to the first busbar and the second busbar via the conductive loop, wherein
   the switch circuit comprises a first branch and a second branch, the first branch comprises a first contactor and a first diode, wherein a control end of the first contactor is coupled with the first power controller, a first end of the first contactor is coupled with the battery module, a second end of the first contactor is coupled with a negative electrode of the first diode, and a positive electrode of the first diode is coupled with the first busbar; and the second branch comprises a second contactor and a second diode, wherein a control end of the second contactor is coupled with the first power controller, a first end of the second contactor is coupled with the second end of the first contactor, a second end of the second contactor is coupled with the first busbar, a positive electrode of the second diode is coupled with the first end of the first contactor, and a negative electrode of the second diode is coupled with the first end of the second contactor;
   the first power controller is configured to: under the charging mode, turn on the first contactor and turn off the second contactor, so as to conduct the first branch in the first direction; and under the discharging mode, turn on the second contactor and turn off the first contactor, so as to conduct the second branch in the second direction;
   the apparatus for controlling battery module further comprises a circuit breaker, wherein the circuit breaker is coupled in the conductive loop and coupled with the first power controller; and
   the first power controller is further configured to: after turning off the first contactor, detect a voltage between the first end of the first contactor and second end of the first contactor, and in a case of the voltage between the first end of the first contactor and the second end of the first contactor being smaller than a first preset voltage, switch the circuit breaker from a conductive state to a cutoff state; and after turning off the second contactor, detect a voltage between the first end of the second contactor and the second end of the second contactor, and in a case of the voltage between the first end of the second contactor and the second end of the second contactor being smaller than a second preset voltage, switch the circuit breaker from the conductive state to the cutoff state.

2. The apparatus for controlling the battery module of claim 1, further comprising: a current sensor, coupled with the first power controller, and configured to detect a current in the conductive loop,
   wherein, the first power controller is further configured to:
      under the charging mode, turn on the second contactor in a case of the current detected by the current sensor being greater than a first preset current, after turning on the first contactor and turning off the second contactor; and under the discharging mode, turn on the first contactor in a case of the current detected by the current sensor being greater than a second preset current, after turning on the second contactor and turning off the first contactor.

3. The apparatus for controlling the battery module of claim 1, wherein the first power controller is further configured to:
   under the charging mode, in a state of both the first contactor and the second contactor being turned on, turn off the first contactor in response to a monitored power of the battery module being greater than a third preset power; and
   under the discharging mode, in the state of both the first contactor and the second contactor being turned on, turn off the second contactor in response to a monitored power of the battery module being smaller than a fourth preset power.

4. The apparatus for controlling the battery module of claim 1, wherein a rated power of the first diode is greater than or equal to a rated power of the battery module.

5. The apparatus for controlling the battery module of claim 1, further comprising:
   an adjusting circuit comprising a resistor, wherein a first end of the resistor is coupled with the first end of the first contactor, and a second end of the resistor is coupled with the second end of the second contactor;
   wherein, the first power controller is further configured to:
      in a case of the current detected by the current sensor being greater than a third preset current or in a case of a first difference between the voltage between the first busbar and the second busbar and the voltage of the battery module being greater than a first preset difference, turn off the first contactor and the second contactor.

6. The apparatus for controlling the battery module of claim 5, wherein:
   the adjusting circuit further comprises a third contactor coupled with the resistor in series, the first end of the resistor is coupled with the first end of the first contactor via the third contactor, or the second end of the resistor is coupled with the second end of the second contactor via the third contactor, and a control end of the third contactor is coupled with the first power controller; and the first power controller is further configured to: in the case of the current detected by the current sensor being greater than the third preset current or in the case of the first difference between the voltage between the first busbar and the second busbar and the voltage of the battery module being greater than a first preset difference, turn off the first contactor and the second contactor and turn on the third contactor.

7. The apparatus for controlling the battery module of claim 5, wherein:
the first power controller is further configured to turn on the first contactor and the second contactor in response to receiving a discharging instruction, and turn off the first contactor and the second contactor in response to receiving a charging instruction.

8. The apparatus for controlling the battery module of claim 1, wherein the circuit breaker comprises:
a first pair of contacts, coupled between the battery module and the switch circuit, and configured to be electrically contacted with each other in a case of the circuit breaker being in the conductive state and to be electrically isolated from each other in case of the circuit breaker being in the cutoff state; and
a second pair of contacts, coupled between the battery module and the second bulbar, and configured to be electrically contacted with each other in a case of the circuit breaker being in the conductive state and to be electrically isolated from each other in case of the circuit breaker being in the cutoff state.

9. The apparatus for controlling the battery module of claim 1, wherein the circuit breaker is manually operable to be conducted.

10. The apparatus for controlling the battery module of claim 1, further comprising: a toggle circuit, coupled with the first power controller, the battery module, and an external power supply, and configured to couple one of the battery module and the external power supply to the first power controller under a control of the first power controller;
the first power controller is further configured to: detect a voltage of the external power supply, and in a case of the voltage of the external power supply being smaller than a third preset voltage, couple the battery module to the first power controller, and in a case of the voltage of the external power supply being greater than or equal to the third preset voltage, couple the battery module to the external power supply.

11. A power supply device, comprising:
the apparatus for controlling the battery module according to claim 1,
wherein the power supply device comprises a plurality of battery modules, the plurality of battery modules are coupled in series and are divided into a first group of battery modules and a second group of battery modules, and the power supply device further comprises:
a fuse, coupled between the first group of battery modules and the second group of battery modules, and configured to be fused in response to a temperature exceeding a preset temperature.

12. A power supply device, comprising:
the apparatus for controlling the battery module according to claim 1,
wherein the battery module comprises:
a lithium battery pack; and
a second power controller, coupled with the first power controller, and configured to detect a power of the lithium battery pack and a voltage of the lithium battery pack, and supply the detected power of the lithium battery pack and the detected voltage of the lithium battery pack to the first power controller.

13. A power supply system, comprising:
a plurality of power supply devices, each of the plurality of power supply devices including the apparatus for controlling the battery module according to claim 1; and
a third power controller, coupled with the first power controller of each of the plurality of power supply devices, and configured to: receive a voltage or power of the battery module in each power supply device supplied by the first power controller of said each power supply device, select at least one of the plurality of power supply devices as a charged device and at least another one of the plurality of power supply devices as a charging device based on the voltage or power of the battery module, transmit a charging instruction to the charged device, and transmit a discharging instruction to the charging device.

14. A method of controlling the battery module performed by the apparatus for controlling the battery module of claim 1, comprising:
detecting, by the first power controller, the voltage between the first busbar and the second busbar, and monitoring the voltage of the battery module and the power of the battery module;
the first power controller entering the charging mode in the case of the voltage between the first busbar and the second busbar being greater than the voltage of the battery module and the power of the battery module being smaller than the first preset power, and under the charging mode, control the switch circuit to conduct in the first direction, to charge the battery module via the conductive loop by using the voltage between the first busbar and the second busbar; and
the first power controller entering a discharging mode in the case of the voltage between the first busbar and the second busbar being smaller than the voltage of the battery module and the power of the battery module being greater than the second preset power, and under the discharging mode, control the switch circuit to conduct in the second direction opposite to the first direction, to cause the battery module to supply power to the first busbar and the second busbar via the conductive loop.

* * * * *